C. F. BUSH.
MACHINE FOR MARKING STAMPS.
APPLICATION FILED DEC. 14, 1911.
1,040,617.
Patented Oct. 8, 1912.
6 SHEETS—SHEET 5.
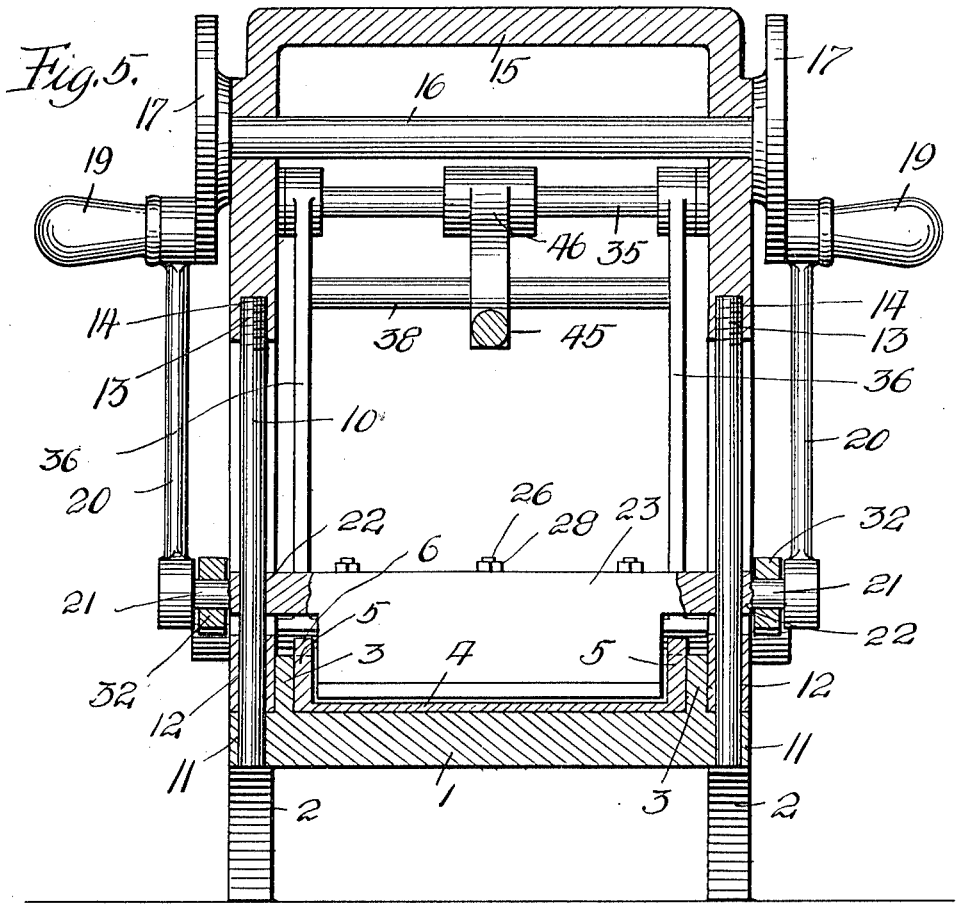
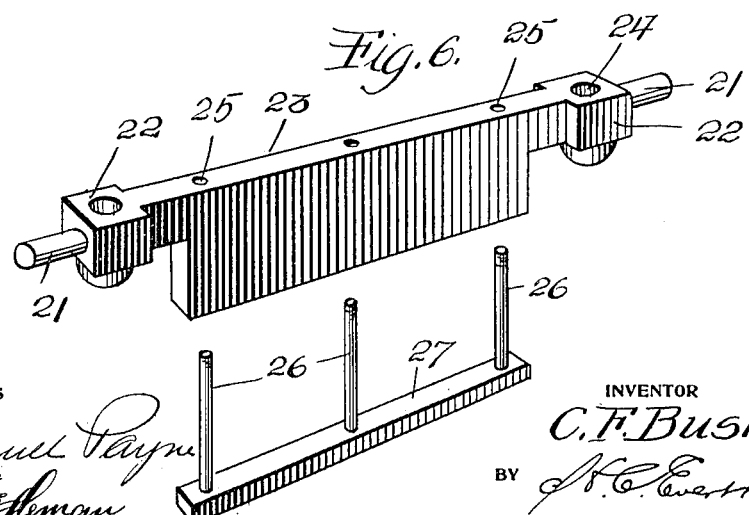
WITNESSES
INVENTOR
C. F. Bush.
BY
ATTORNEYS C. F. BUSH.
MACHINE FOR MARKING STAMPS.
APPLICATION FILED DEC. 14, 1911.
1,040,617.
Patented Oct. 8, 1912.
6 SHEETS—SHEET 6.
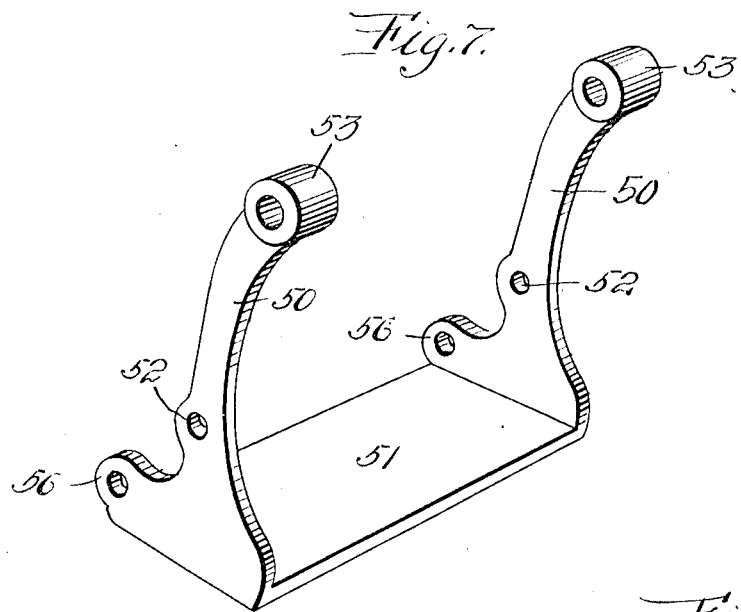
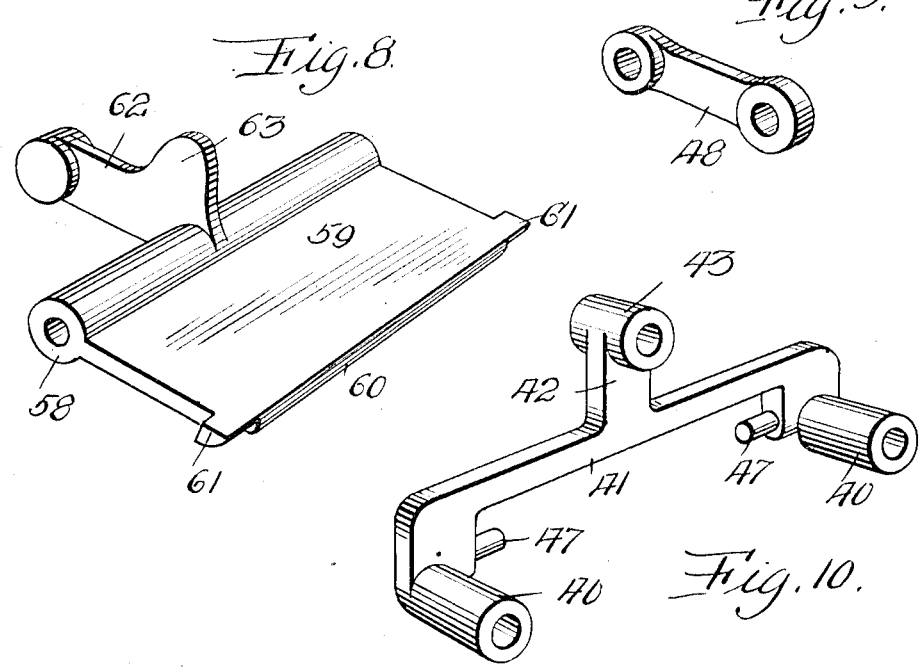

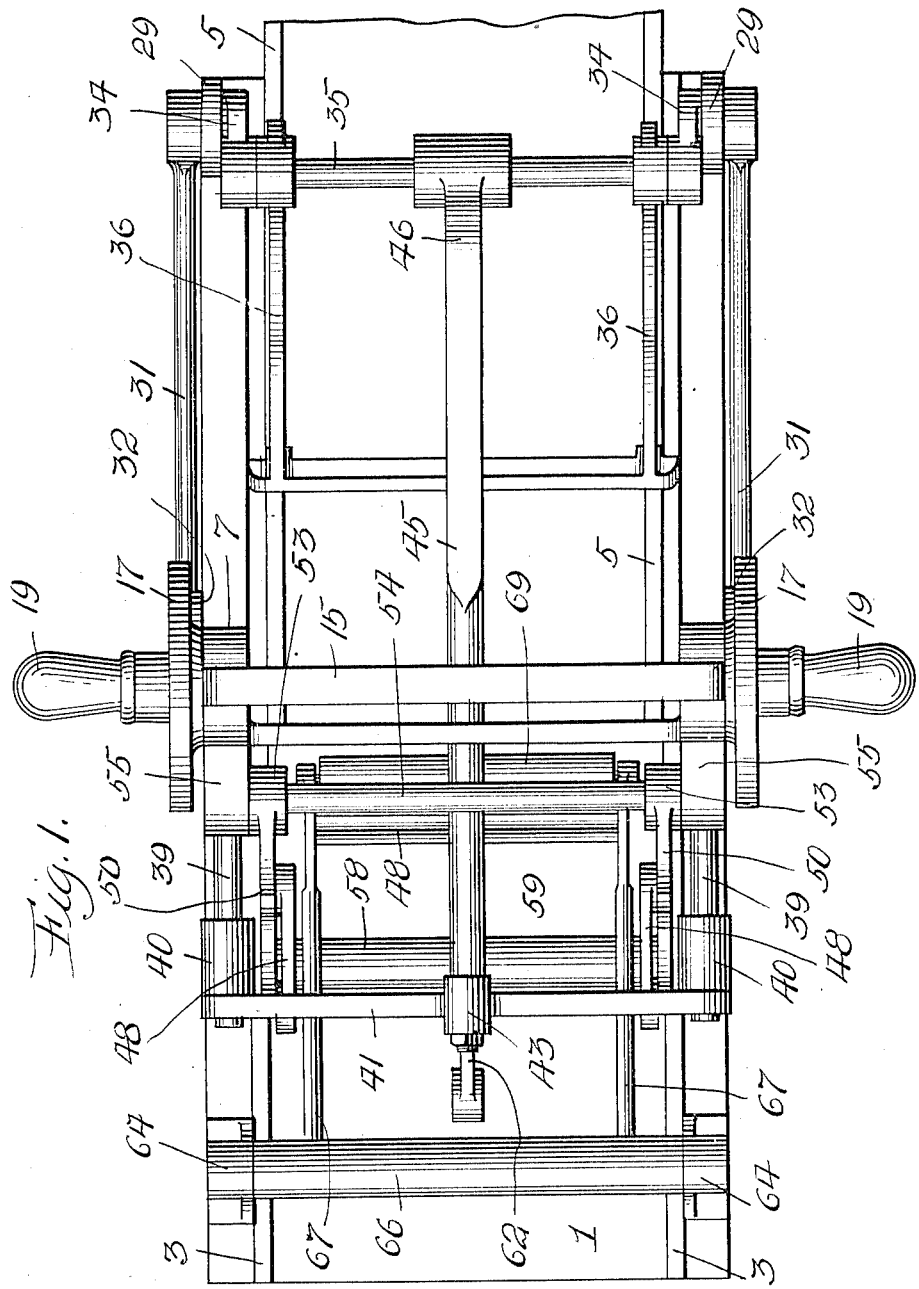

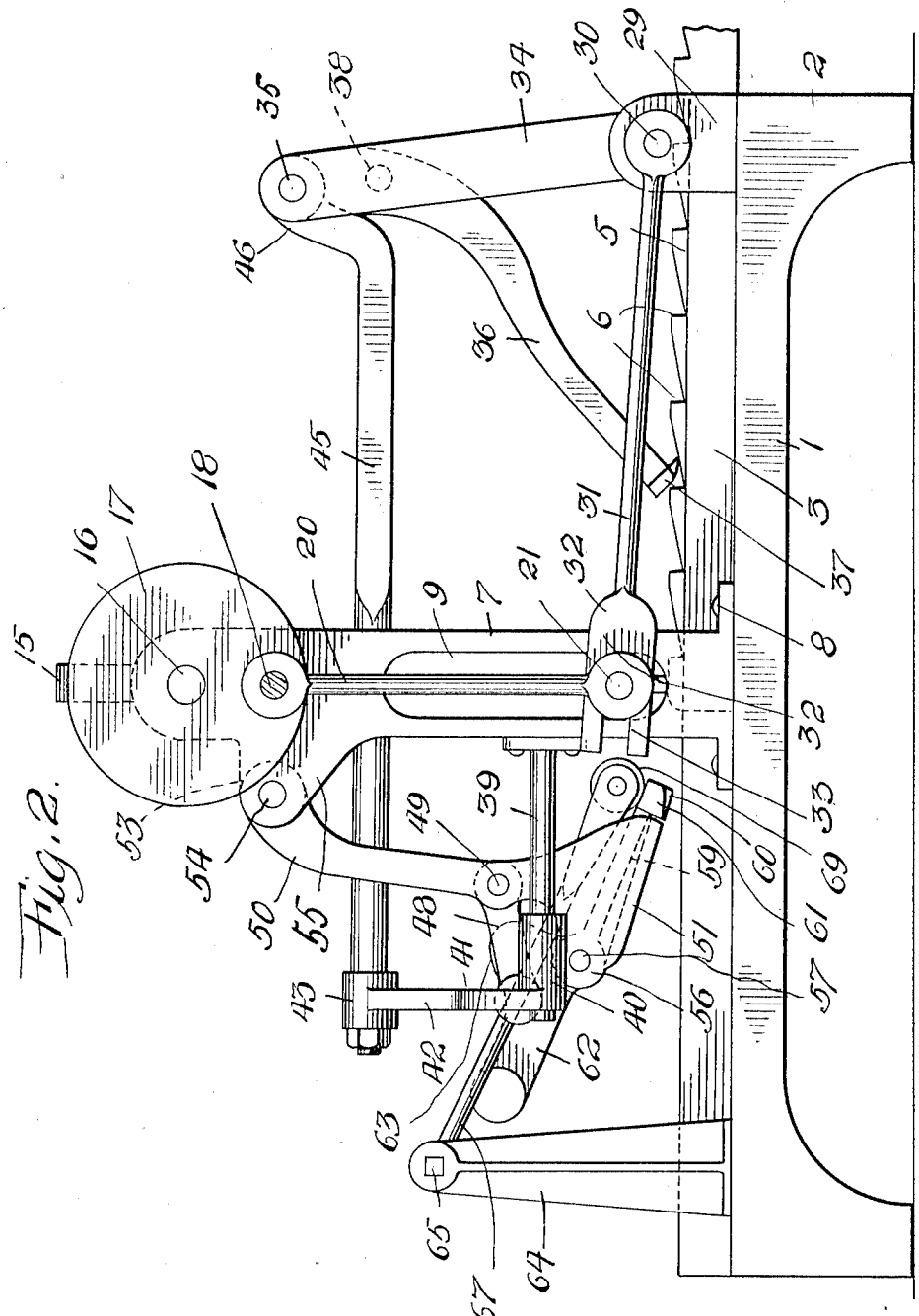

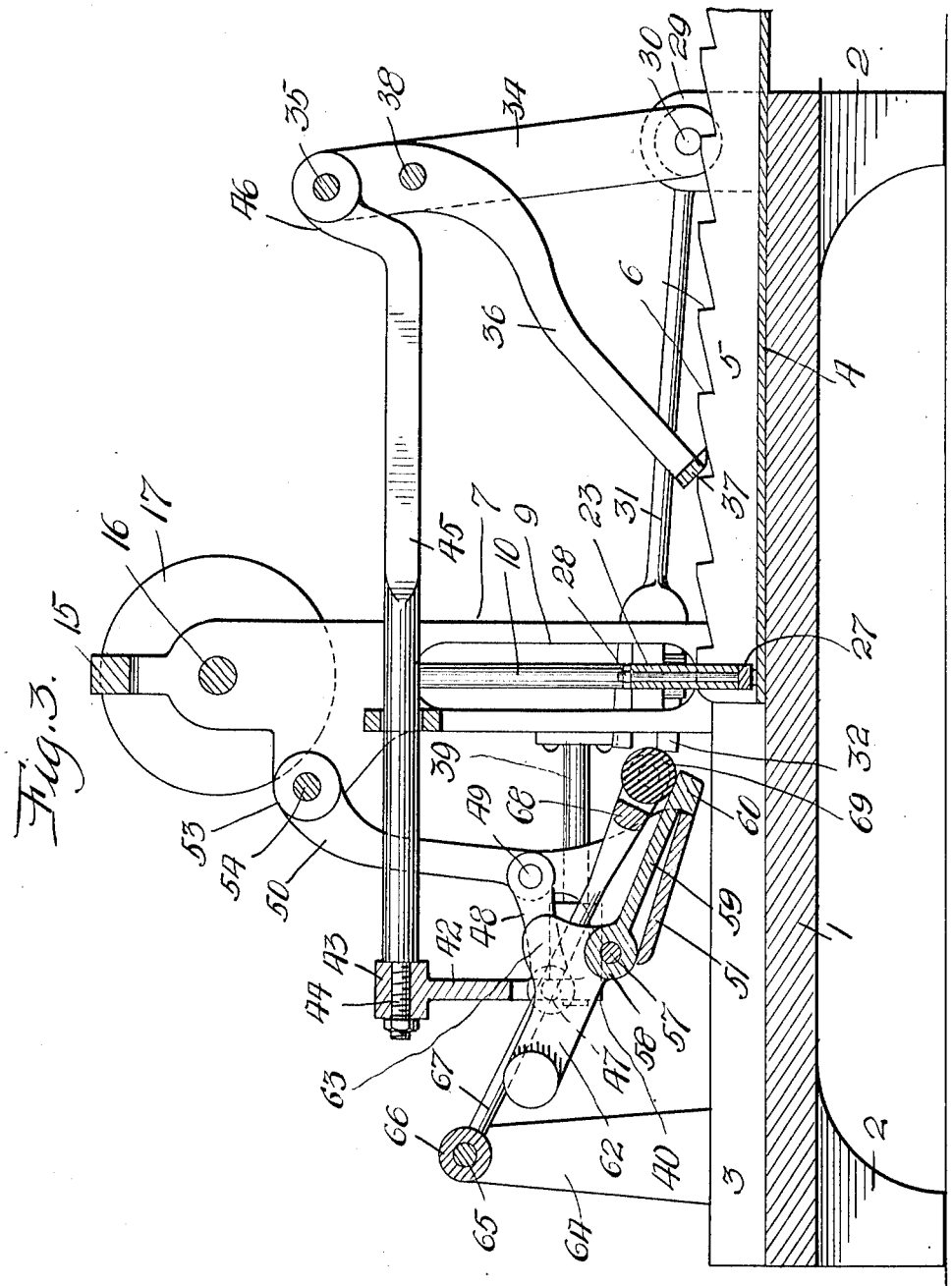

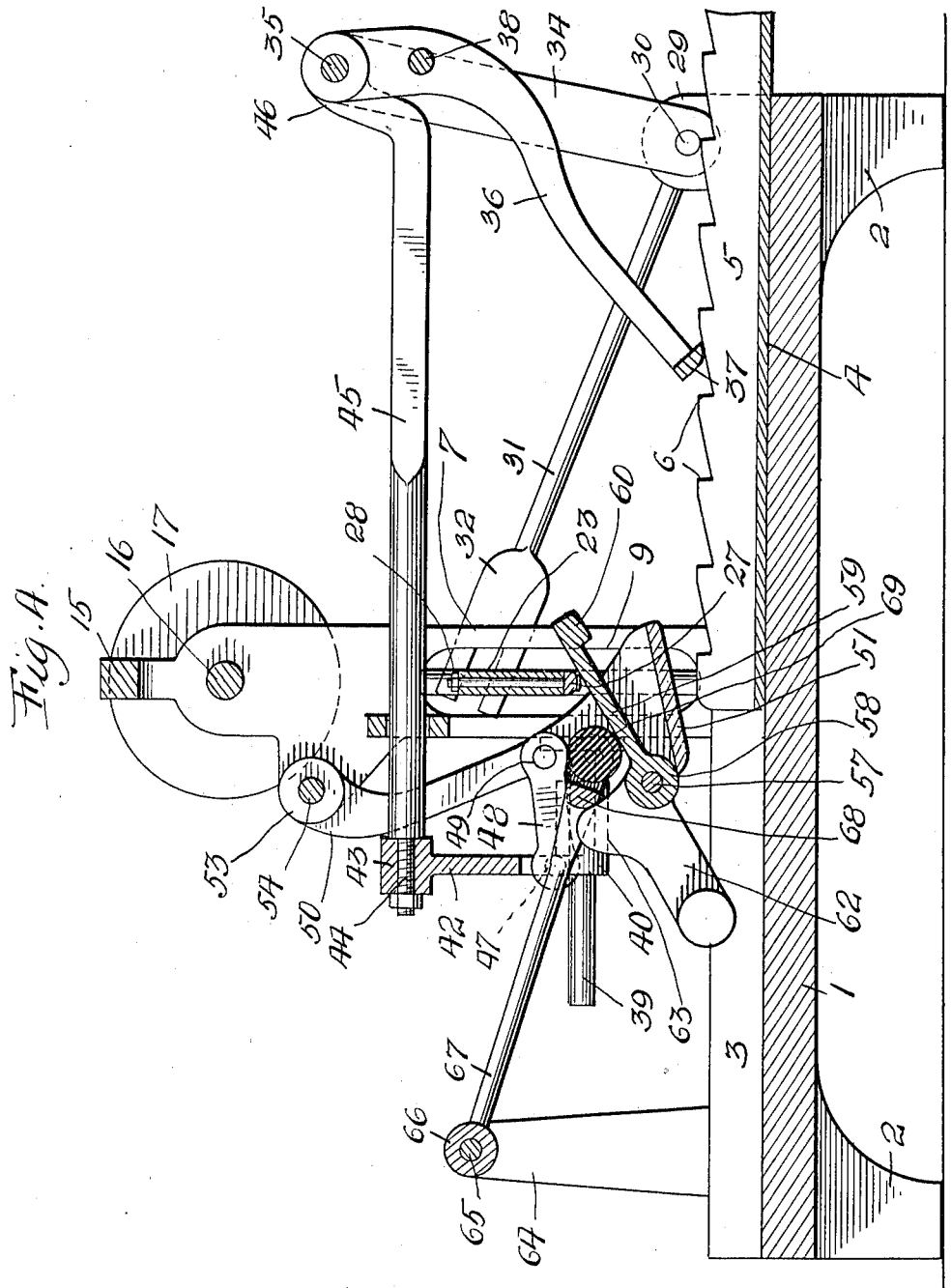

UNITED STATES PATENT OFFICE.

CHARLES FRANKLIN BUSH, OF ERIE, PENNSYLVANIA.

MACHINE FOR MARKING STAMPS.

1,040,617.  Specification of Letters Patent.  Patented Oct. 8, 1912.

Application filed December 14, 1911. Serial No. 665,769.

*To all whom it may concern:*

Be it known that I, CHARLES FRANKLIN BUSH, a citizen of the United States of America, residing at Erie, in the county of Erie and State of Pennsylvania, have invented certain new and useful Improvements in Machines for Marking Stamps, of which the following is a specification, reference being had therein to the accompanying drawing.

This invention relates to a machine for marking stamps, and the primary object of my invention is to provide a novel machine for expeditiously and economically perforating, printing or otherwise marking stamps in the form of large sheets that can be automatically fed into the machine.

Another object of this invention is to provide a printing machine embodying positive and reliable means in a manner as will be hereinafter set forth, for marking stamps whereby the same can be easily identified in connection with the territory in which they are used, thereby preventing the disposal of quantities of stolen stamps in territories other than that identified upon the stamps.

A further object of this invention is to accomplish the above results by a machine consisting of parts that are easily assembled to coöperate in accurately marking stamps fed into the machine.

With the above and other objects in view the invention resides in the novel construction, combination and arrangement of parts to be hereinafter specifically described and then claimed.

Reference will now be had to the drawings wherein there is illustrated a preferred embodiment of the invention, but it is to be understood that the structural elements are susceptible to such variations as fall within the scope of the appended claims.

In the drawings like numerals denote corresponding parts throughout the several views, in which:—

Figure 1 is a plan of the machine. Fig. 2 is a side elevation of the same. Fig. 3 is a longitudinal sectional view of the machine showing the same in a printing position. Fig. 4 is a similar view showing the machine in an inking position. Fig. 5 is a cross sectional view of the machine. Fig. 6 is a perspective view of a detached type holder. Fig. 7 is a perspective view of a detached oscillatory tray. Fig. 8 is a perspective view of a detached inking pad or tray. Fig. 9 is a perspective view of a link forming part of the machine, and Fig. 10 is a perspective view of a detached reciprocatory head.

A machine in accordance with this invention comprises an oblong horizontal bed plate 1 supported by suitable legs or supports 2. The bed plate 1, adjacent to the side edges thereof, is provided with longitudinal parallel vertical guides or walls 3 for a stamp tray 4 having side walls 5 engaging the guides 3. The tray 4 has open ends and the upper edges of the walls 5 are provided with equally spaced ratchet teeth 6. The tray 4 is adapted to contain a large sheet of stamps to be printed within the machine.

The bed plate 1, intermediate the ends thereof, is provided with oppositely disposed standards 7 that are secured to the bed plate 1, at the outer sides of the guides 3, by bolts 8 or other fastening means. The standards 7 are provided with vertical openings or windows 9 and arranged within the openings are guide rods 10, best shown in Fig. 5. The rods 10 extend upwardly through openings 11 and 12 provided therefor in the bed plate 1 and in the standards 7, said rods having the upper ends thereof screw threaded, as at 13 to engage in sockets 14 provided therefor in the upper walls of the openings 9 of the standards 7. The upper ends of the standards 7 are connected by a transverse integral frame 15 and journaled in the upper ends of said standards is a transverse operating shaft 16 having the ends thereof provided with wheels 17. The wheels 17 have the outer sides thereof provided with eccentrically arranged wrist pins or cranks 18 upon which can be mounted handles 19 for operating the machine by hand, but provision can be made for resorting to any suitable source of power for operating the machine.

Pivotally mounted upon the wrist pins 18, between the wheels 17 and the handles 19, are pitmans 20 having the lower ends thereof pivotally mounted upon pins 21 carried by the heads 22 of a type holder 23. The heads 22 are provided with vertical openings 24 and said heads are slidably mounted upon the rods 10. The type holder 23 has vertical openings 25 to receive the vertical bolts 26 of a type bar 27, said bolts to be retained within the openings 25 by nuts 28 screwed upon the upper ends of the bolts, said bolts and nuts retaining the type bar 27 in engagement with the lower edge of the type holder 23. In lieu of the type bar a perforating bar can be used.

The bed plate 1, at the forward end thereof and at the outer sides of the guides 3 is provided with bearings 29 for rock shafts 30. Mounted upon the outer ends of the rock shafts are actuating bars 31 having the rear ends thereof enlarged, as at 32 and bifurcated or slotted, as at 33 to receive the pins 21. The bifurcations or slots of the bars 31 are of a sufficient length whereby the bars can ride upon the pins 21 and impart a rocking movement to the shafts 30 when the type holder is vertically reciprocated.

The inner ends of the rock shafts 30 are provided with vertical cranks 34 having the upper ends thereof connected by a transverse rod 35. Pivotally mounted upon the rod 35, adjacent to the cranks 34, is a gravity feeding device, comprising curved side arms 36 having the lower ends thereof connected by transverse feed bars 37 and adjacent to the upper ends there is a connecting rod 38. The feed bar 37 is adapted to engage the teeth 6 of the stamp tray 4 and intermittently move or feed the tray into the machine and beneath the type bar 27.

The rear sides of the standards 7, adjacent to the lower ends thereof, are provided with rearwardly extending horizontal guide rods 39 and slidably mounted upon said rods are the sleeves 40 of a reciprocatory head 41. This head, intermediate the ends thereof, is provided with an upright 42 having a bearing 43 and mounted in said bearing is the reduced end 44 of an actuating rod 45, said rod having the forward end thereof bent upwardly, as at 46 and loosely mounted upon the rod 35. The reciprocatory head 41 has the ends thereof provided with inwardly projecting pins 47 and loosely mounted upon said pins are links 48 that are loosely connected to inwardly projecting pins 49, carried by the arms 50 of an oscillatory tray 51, said arms being apertured, as at 52 to receive the pins 49. The upper ends of the arms 50 are provided with sleeves 53 to receive a transverse rod 54 mounted in brackets 55 formed integral with the rear sides of the standards 7.

The lower ends of the arms 50 of the oscillatory tray 51 are provided with apertured ears 56 and mounted in said ears is a transverse rod 57. Pivotally mounted upon said rod is a barrel 58 of an inking pad or tray 59 that has the front edge provided with a ledge 60 and lugs 61 to engage the forward edge of the tray 51 and the forward edges of the arms 50 of the oscillatory tray 51. The barrel 58 of the inking pad has a rearwardly extending counterbalance or weight 62 intermediate the ends thereof, said counterbalance having a cam 63.

The bed plate 1, at the rear end thereof and the outer sides of the guides 3, is provided with oppositely disposed uprights 64 and mounted in said uprights is a transverse shaft 65. Pivotally mounted upon the shaft 65 is a barrel 66 provided with forwardly projecting parallel arms 67 that are connected, adjacent to the forward ends thereof, by a cam contacting bar 68. Revolubly mounted between the forward ends of the arms 67 is an inking roller 69 made of rubber or other yieldable material.

In operation:—I will assume that one or more sheets of postage or trading stamps have been placed upon the tray 4, that the tray 4 has been placed upon the bed plate 1 with the feeding bar 37 in engagement with the innermost teeth 6 of the tray, and that ink has been placed upon the pad or tray 59. When the machine is placed in operation the tray 4 is intermittently fed or moved step by step upon the bed plate, between the guides 3, the first movement of the tray placing the first row of stamps beneath the type bar 27. As the type bar 27 is elevated through the medium of the pitmans 20 and the pins 21, the shafts 30 are rocked, the first movement of the shafts 30 retracting the feeding bar 37, this being accomplished during an up stroke of the type holder. It is during a down stroke of the type holder that the tray 4 is advanced upon the bed plate and left stationary just as the type bar 27 contacts with the stamps upon the tray. During an upward movement of the type holder and a retracted movement of the feeding bar 37, the actuating rod 45 is moved to shift the reciprocatory head forward upon the rods 39. The suspended oscillatory tray 51 is moved forward through the medium of the links 48 and as the inking pad 59 is carried by said tray, the inking roller 69 is revolved upon the pad by reason of said roller being held between the arms 67. As the tray 51 and the pad 59 are moved forward, the contact bar 68 rides into engagement with the cam 63, elevating the pad 59. Such elevation is accomplished at the highest stroke of the type holder 23 and at the limit of retraction of the feeding bar 37. As the type holder is elevated and the contact bar 68 engages the cam 63, the inking pad, which has been shifted beneath the type holder, is elevated to engage the type bar 27 and places ink upon said bar or the type thereof. A further elevation of the type holder places the inking pad at an inclination to the type bar, as shown in Fig. 4, but when the type holder is lowered, the type bar is again wiped by the inking pad and in this manner ink is applied to the type bar two times before each impression of the type bar upon the stamps arranged upon the tray 4. The trays 4 can be successively fed into the machine and automatically advanced by the tray feeding device.

The machine in its entirety is automatic throughout, it being only necessary to apply printers' ink to the roller 69 and to place the stamp trays upon the bed plate 1. As the feeding device is loosely arranged upon the rod 35 a tray of stamps can be pushed under the feeding bar 37, to be fed forward when the type holder descends.

While the machine has been primarily designed for printing or marking stamps, it is to be understood that the machine can be employed for labeling or printing upon matter placed upon the bed plate beneath the type holder. The machine in its entirety can be made of light and durable metal and of various sizes.

What I claim is:—

1. In a printing machine, a bed plate, a tray movably mounted upon said bed plate, a vertical reciprocatory type holder movable to and from said tray, a tray feeding device operatively connected with and actuated by a movement of said type holder and detachably engaging with the tray for intermittently feeding it, and a movable inking pad operatively connected with and actuated by said feeding device for applying ink at the up and down strokes of said type holder.

2. In a printing machine, a bed plate, a tray movably mounted upon said bed plate, a vertical reciprocatory type holder movable to and from said tray, a tray feeding device operatively connected with and actuated by a movement of said type holder for intermittently feeding the tray, a movable inking pad operatively connected with and actuated by said feeding device for applying ink at the up and down strokes of said type holder, and an inking roller adapted to move back and forth upon said pad during a movement of said pad as the pad is shifted toward and from the type holder.

3. In a stamp printing machine, a bed plate, a stamp tray adapted to be intermittently moved upon said bed plate, a vertical reciprocatory type holder adapted to mark the stamps within said tray during a cessation in the movement of said tray, mechanism operatively connected with and actuated by said type holder and detachably engaging with said tray for intermittently shifting it through the reciprocatory movement of the type holder and means including an inking pad and roller adapted to be shifted simultaneous with the movement of said tray and by the means for shifting the tray for applying ink to the type of said type holder.

4. A printing machine comprising a bed plate, a tray movable thereon, standards carried by said bed plate, a vertical reciprocatory type holder movable between said standards, means for operating said type holder, means actuated by a movement of said type holder for feeding said tray upon said bed plate, a pivoted inking pad actuated by the last mentioned means for applying ink to said type holder during the upward stroke thereof, and an inking roller movably supported by said bed plate upon said inking pad and adapted to traverse said inking pad during the movement thereof.

5. In a stamp printing machine, a bed plate, a stamp feeding tray mounted upon said plate, means carried by said bed plate and engaging with said tray for intermittently feeding the same, a reciprocatory type holder for marking the stamps fed by said tray, an operative connection between said type holder and said means for operating the latter, an inking mechanism capable of applying ink to the type of said holder during the up and down strokes of the holder, and an operative connection between said means and said mechanism for operating the latter simultaneously with the shifting of the said tray.

6. A stamp printing machine comprising a bed plate, a stamp feeding tray mounted thereon and having the sides thereof provided with ratchet teeth, and means carried by said bed plate and detachably engaging with said teeth for intermittently feeding the tray to position the same to carry the stamps, a reciprocatory printing element operating upon the stamps fed by the tray, an operative connection between said means and said element for actuating said element during the reciprocatory movement of said element, a shiftable inking pad for applying ink to said element, and an operative connection between said means and said body for shifting the latter simultaneously with the shifting of the tray.

7. A stamp printing machine comprising a bed plate, a stamp feeding tray mounted thereon and having the sides thereof provided with ratchet teeth, means carried by said bed plate and detachably engaging with said teeth for intermittently feeding the tray to position the same to carry the stamps, a reciprocatory printing element operating upon the stamps fed by the tray, an operative connection between said means and said element for actuating said element during the reciprocatory movement of said element, a shiftable inking pad for applying ink to said element, an operative connection between said means and said pad for shifting the latter simultaneously with the shifting of the tray, and an inking roller movable upon said pad during the shifting of the latter.

8. A stamp printing machine comprising a bed plate, an intermittently operable stamp feeding device mounted upon said bed plate, a reciprocatory printing element operating upon the stamps fed by said device, means connected to said printing element, operated thereby and detachably engaging the said device for intermittently feeding it, an inking device for applying ink to said element during the up and down strokes thereof, and mechanism operatively connected with said means and with said inking device for operating the latter simultaneously with the operating of said stamp feeding device.

9. A stamp printing machine comprising a bed plate, an intermittently operable stamp feeding device mounted upon said bed plate, a reciprocatory printing element operating upon the stamps fed by said device, means connected to said printing element, operated thereby and detachably engaging the said device for intermittently feeding it, an inking device for applying ink to said element during the up and down strokes thereof, mechanism operatively connected with said means and with said inking device for operating the latter simultaneously with the operating of said stamp feeding device, and an inking roller capable of supplying ink to said inking device during the operation of the latter.

In testimony whereof I affix my signature in the presence of two witnesses.

CHARLES FRANKLIN BUSH.

Witnesses:
  MAX H. SROLOVITZ,
  CHRISTINA T. HOOD.

---

Copies of this patent may be obtained for five cents each, by addressing the "Commissioner of Patents, Washington, D. C."